UNITED STATES PATENT OFFICE.

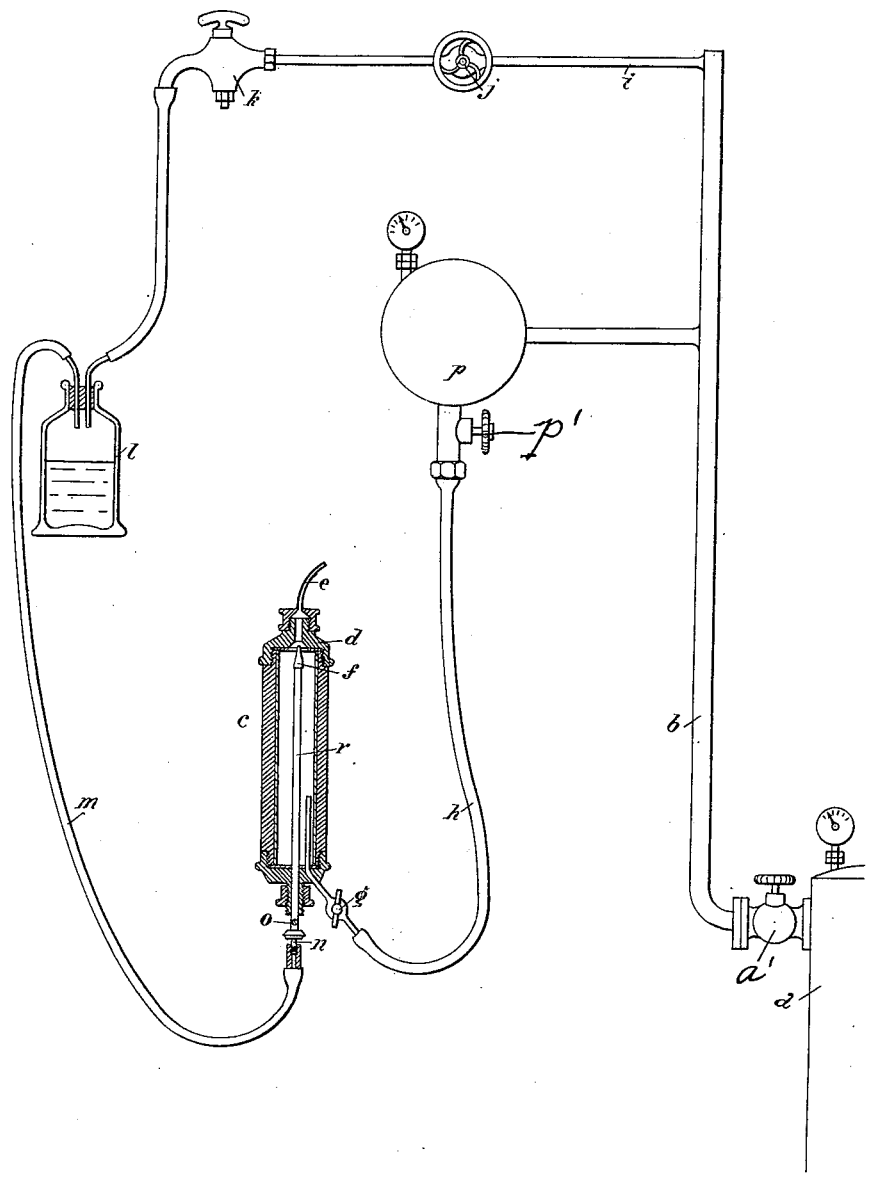

LOUISE PRAT, OF LYONS, FRANCE.

APPARATUS FOR PROJECTING HEATED AIR.

SPECIFICATION forming part of Letters Patent No. 656,213, dated August 21, 1900.

Application filed May 1, 1900. Serial No. 15,092. (No model.)

*To all whom it may concern:*

Be it known that I, LOUISE PRAT, (née MINARD,) a citizen of France, residing at Lyons, France, have invented a new and useful Apparatus for Projecting Highly-Heated Air Under Pressure, of which the following is a full, clear, and exact description, and for which I have made application for patent in France, dated December 4, 1899.

The apparatus forming the subject of the present invention is intended for the application of a new therapeutic method which consists in projecting upon the affected parts a small jet of air heated to a high temperature with the object of benumbing, purifying, or cauterizing such parts.

The accompanying drawing shows the arrangement of the complete apparatus.

$a$ is a reservoir which may be of various dimensions, according to the importance of the installation, and in which air is compressed to a pressure which may rise to fifty atmospheres, according to requirements.

$b$ is a main conduit capable of supplying one or several apparatuses similar to that about to be described and which is represented in the drawing at $c$.

The said apparatus is of the following construction:

$c$ is a tube which is made of or covered with badly-conducting material to enable it to be readily handled. It is closed at its upper part by a cap or stopper $d$, onto which are screwed nozzles of different shapes—such, for instance, as $e$—which serve to project the hot air upon the affected part. At the lower part it carries two tubes—one at its axis, serving to receive the heating apparatus $f$, the other at the side, provided on the exterior with a regulating-cock $g$, to which is connected a flexible tube $h$, conveying compressed air to the interior of the tube. Between the conduit $b$ and the cock $g$ is interposed a reducing-valve $p$ of any known and suitable construction, bringing the air from the reservoir to the most convenient pressure for the operation for which it is required. The air thus introduced into the tube $e$ is heated near its exit by a platinum tube $f$, closed and brought to incandescence by a current of carbureted air entering the interior. For this purpose a special conduit $i$, branching from the conduit $b$, conveys a current of compressed air to the interior of a reservoir $l$, containing a sufficiently-volatile hydrocarbon. The air, mixed with carbureting-vapors, is delivered by a conduit $m$ into a tube $n$, surrounded by a tube $r$, which traverses the apparatus $c$ axially and is terminated by the platinum tube $f$. After having maintained incandescence it leaves the apparatus by the exterior tube $r$, whence it escapes into the atmosphere by an opening $o$, formed in said tube.

The entrance of air into the reservoir $l$ is regulated by a cock $k$. The valve $j$ serves to isolate the reservoir at the end of the operation without disarranging the opening of the cock $k$.

According to the quantity of air consumed by the jet or nozzle $e$ and the temperature desired to be given to it, larger or smaller platinum tubes are employed, and the supply of carbureted air is regulated to maintain their incandescence.

The tubes $m$ and $h$, which lead to the apparatus $c$, are flexible, thereby enabling the apparatus to be readily manipulated and to conduct the air to the affected part. The jet can be moderated or stopped during the operation by means of the cock $g$. Before directing the carbureted air into the platinum tube $f$ the operation is commenced by heating said tube to incandescence, which is then maintained by the gaseous current.

$a'$ is a stop-cock between the conduit $b$ and the reservoir $a$, and $p'$ is a stop-cock between the reducing-valve $p$ and the tube $h$.

Having fully described my invention, what I claim, and desire to secure by Letters Patent, is—

1. In combination with a tube through which air may be projected to the affected part directly, an air-reservoir, a conduit-pipe leading therefrom to the tube, a reducing-valve in said pipe, a platinum tube in said air-projecting tube, an air-pipe leading from the said reservoir to the platinum tube and a carbureter in the said air-pipe, substantially as described.

2. In an apparatus for projecting air at a determined pressure and temperature, the combination of a high-pressure air-reservoir, a reducing-valve, an air-carbureting apparatus, tubes connecting the compressed-air reservoir with the reducing-valve and carbureting apparatus, a non-conducting air heating and projecting apparatus connected by tubes to the reducing-valve, and carbureting apparatus, and regulating and stop cocks on the tubes connecting the compressed-air reservoir with the reducing-valve and carbureter and on the tube connecting the reducing-valve with the air heating and projecting apparatus, substantially as herein set forth.

3. In an apparatus for projecting air at a determined pressure and temperature, the combination with a high-pressure air-reservoir, a reducing-valve and a carbureting apparatus connected together by tubes provided with suitable stop-cocks and regulating-cocks, of an air heating and projecting apparatus consisting of a closed non-conducting cylinder, having an air-projecting nozzle at one end, a movable central tube connected to the carbureter by a flexible tube and conveying the carbureted air to the interior of the apparatus near to the nozzle, a tube surrounding said central tube and closed at its upper end by a closed platinum tube and passing to the exterior of said apparatus where it is provided with an exit-orifice, and a short side tube at its lower end provided with a regulating-cock and connected to the reducing-valve by a flexible tube fitted with a stop-cock, substantially as herein set forth.

In testimony whereof I affix my signature in presence of two witnesses.

LOUISE PRAT.

Witnesses:
    THOS. N. BROWNE,
    GASTON JEAUNIAUX.